April 27, 1948.  W. E. CLEMENTS  2,440,461
METHOD OF SEALING THE STEM OF HOLLOW VALVES
Filed April 22, 1944
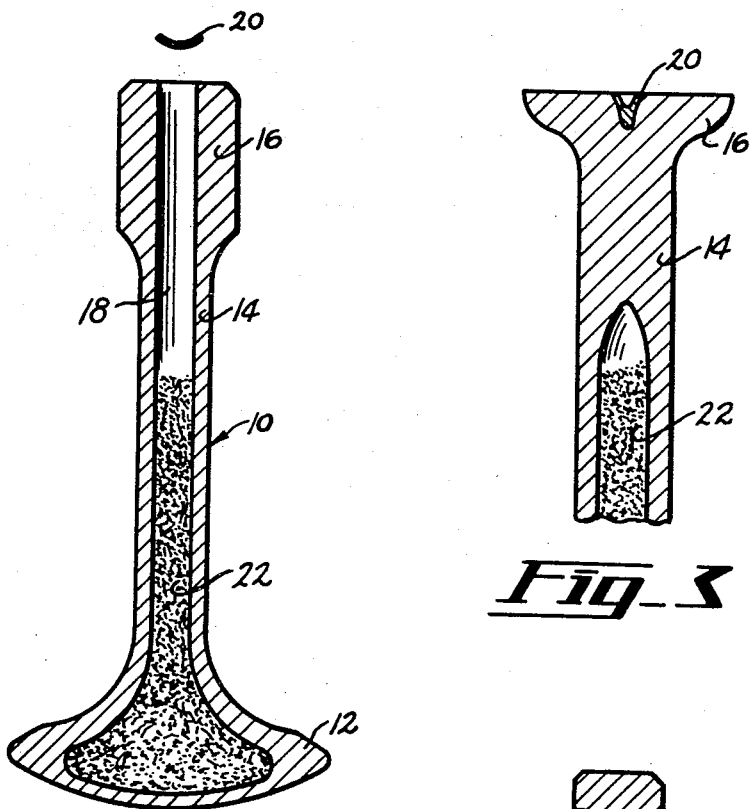
Fig. 1
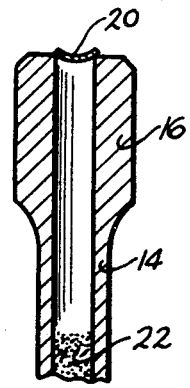
Fig. 2
Fig. 3
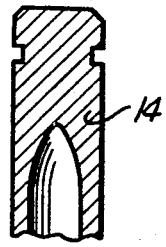
Fig. 4
INVENTOR.
William E. Clements Patented Apr. 27, 1948

2,440,461

UNITED STATES PATENT OFFICE 2,440,461

METHOD OF SEALING THE STEM OF HOLLOW VALVES

William E. Clements, Battle Creek, Mich., assignor to Eaton Manufacturing Company, Cleveland, Ohio, a corporation of Ohio Application April 22, 1944, Serial No. 532,277

3 Claims. (Cl. 29—156.7)

This invention relates to poppet valves and more particularly to coolant contained hollow poppet valves adapted to be used in high combustion, high temperature operating internal combustion engines.

It is the present, general practice to seal the coolant for hollow poppet valves in the manner taught in the patent to Jardine No. 1,823,454, wherein the coolant agent for the valve is not inserted in the valve cavity until after the stem end of the valve has been completely forged and machined and a hole has been centrally drilled in the stem end with the result that the cleaning of the cavity to eliminate foreign matter therefrom is done after the drilling of the hole. This cleaning operation has not proved entirely satisfactory in view of the limited opening through which the cleaning solution must pass in washing the cavity with the consequence that any foreign matter remaining in the cavity after the insertion of the coolant and sealing of the cavity causes failure of the valves through the expansion of moisture remaining in the cavity when the valve is placed under operating conditions wherein the valve is subjected to elevated temperatures. Accordingly, it is the premise of the instant invention to reduce if not entirely eliminate the possibility of failure of the valve occasioned by producing a hollow coolant contained valve in accordance with the present general practice.

Broadly, the invention comprehends the fabrication of a hollow coolant contained poppet valve comprising forging and machining the valve to substantial completion so as to provide a longitudinal body and head cavity and an enlarged portion on the end of the valve stem; inserting a predetermined amount of coolant agent in the cavity; heating the valve so as to dispel all moisture; welding a member on the stem end of a valve so as to seal a coolant agent in the valve cavity; forging the enlarged portion of the valve stem so as to permanently seal the coolant within the valve and simultaneously provide a stem of uniform external diameter throughout its length; and machining the valve to completion.

An object of the invention is the provision of a method of manufacturing a hollow coolant contained valve in a more convenient and consequently more economical manner.

Another object of the invention is the provision of a method of manufacturing a hollow coolant contained valve so that the coolant may be sealed in the cavity of the valve prior to the last swaging operation of the valve stem.

A further object of the invention is the provision of a method of manufacturing internal combustion engine hollow poppet valves which are subjected to high operating temperatures whereby all foreign elements are effectively removed from the valve cavity prior to sealing a coolant agent within the cavity so as to eliminate possible failure of the valve due to the presence of moisture or other foreign matter remaining in the cavity when sealed.

A still further object of the invention is the provision of a hollow valve having a portion closed and swaged together in such a manner as to permanently and perfectly seal the coolant medium within the valve.

And yet, a further object of the invention is the provision of a hollow coolant contained valve whereby the coolant is effectively sealed within the valve free of contact with any foreign elements.

Other objects and advantages of this invention will appear from the following description taken in connection with the drawings forming a part of the specification, and in which:

Figure 1 is a longitudinal cross sectional view of a substantially completed valve prior to insertion and sealing of a coolant agent in the hollow of the valve;

Figure 2 is a fragmentary longitudinal cross sectional view of the valve shown in Figure 1 after the insertion and sealing of the coolant agent within the valve;

Figure 3 is a fragmentary cross sectional view of the valve after swaging together the stem end thereof; and Figure 4 is a fragmentary cross sectional view of the stem end of the valve after completion of the machining operation thereon.

In the production of poppet valves employed in high compression internal combustion engines, it is the practice to construct the valves so as to provide a cavity which is adapted to be partly filled with a coolant agent for the purpose of conducting the heat from the head of the valve to the end of the stem for effective dissipation therefrom. Through the use of a coolant contained valve especially where the valve is employed to control the exhaust of the engine, the valve may operate at a comparatively cool temperature and thereby provide more efficient operation of the engine.

Any suitable coolant agent may be used; such, for example, as sodium or potassium salts just so long as it possesses a melting temperature well below the working temperature of those portions of the valve with which it comes in contact.

It has been found more desirable and practicable to permanently seal the coolant agent within the valve so that high operating temperatures to which the valve is subjected as well as the impact to which the valve is subjected will not cause the loss of any of the coolant agent. Furthermore, it is highly important that the coolant agent be sealed within the cavity of the valve free of association with any foreign matter such as moisture, oil, dirt, or the like so as to minimize failure of the valve. Accordingly, the invention which will now be described provides for the proper permanent method of sealing the coolant agent within the valve.

Referring to the drawings for more specific details of the invention, 10 represents generally a valve comprising an enlarged mushroom-shaped head 12, a stem 14 integral with the head having an enlarged portion 16 at its open end, a cavity 18 in the head of the valve and extending throughout the length of the stem. A plug 20, preferably of curved construction as shown in Figure 1, is adapted to be welded or otherwise suitably secured to the enlarged portion 16 of the valve stem. It is to be noted that the bore or cavity in the stem is of substantially uniform cross sectional area thereby providing for easy cleaning axis of the entire cavity within the valve.

Proceeding from the valve structure shown in Figure 1, the valve cavity is first thoroughly cleaned so as to eliminate the presence of any foreign matter such as oil, dirt, or the like, and the valve is then heated to expel all moisture present therein.

A coolant agent 22 is next inserted in the cavity of the valve so as to partly fill the cavity, and the valve and coolant are then heated to a predetermined temperature sufficient to liquefy the coolant and provide for location thereof in the head end of the valve. Immediately thereafter the plug 20 is welded or otherwise suitably secured over the opening on the stem of the valve so as to inhibit any foreign matter from entering the cavity.

The assembly as fragmentarily shown by Figure 2 is then heated, and the enlarged portion of the valve stem is swaged to provide a permanent and perfect sealing of the coolant within the valve as indicated by Figure 3. A portion of the swaged or extruded portion of the valve is then cut off, and the valve stem and valve are machined to desired final size and configuration.

While this invention has been described in connection with certain specific embodiments, the principle involved is susceptible of numerous other applications that will readily occur to persons skilled in the art. The invention is, therefore, limited only as indicated by the scope of the appended claims.

What I claim is:

1. The method of making a hollow poppet valve comprising making a valve part including a mushroom-shaped head and an integral axially extended stem, said head and stem having a central cavity extending therethrough closed at the head end and opened at the stem end being substantially uniform in diameter throughout the length of the stem and said stem having an enlarged annular portion at the extremity thereof adjacent the open end of the cavity, partly filling the cavity with a cooling medium, placing a plug having a convex surface with its convex surface in line contact relation upon the stem end of the valve part at the junction of the opening into the cavity and the end extremity of the stem, applying an electrical resistance welding current and axial pressure to weld the plug to the stem effective to inhibit foreign matter from the cavity of the valve in the further working of the valve, compressing the enlarged portion of the valve in heated state with the plug as a part thereof to close the cavity in the stem over a portion thereof adjacent the plug and effect a welding of the compressed annular portion of the stem substantially along the axis of the stem so as to seal the cooling medium in the valve part and then removing the end of the compressed portion of the valve stem incorporating the plug.

2. The method of making a hollow poppet valve comprising making a valve part including a mushroom-shaped head and an integral axially extended stem, said head and stem having a central cavity extending therethrough closed at the head end and opened at the stem end being substantially uniform in diameter throughout the length of the stem and said stem having an enlarged annular portion at the extremity thereof adjacent the open end of the cavity, partly filling the cavity with a cooling medium, placing a plug in line contact relation upon the stem end of the valve part at the junction of the opening into the cavity and the end extremity of the stem, applying an electrical resistance welding current and axial pressure to weld the plug to the stem effective to inhibit foreign matter from the cavity of the valve in the further working of the valve, compressing the enlarged portion of the valve in heated state with the plug as a part thereof to close the cavity in the stem over a portion thereof adjacent the plug and effect a welding of the compressed annular portion of the stem substantially along the axis of the stem so as to seal the cooling medium in the valve part and then removing the end of the compressed portion of the valve stem incorporating the plug.

3. The method of making a hollow poppet valve comprising making a valve part including a mushroom-shaped head and an integral axially extended stem, said head and stem having a central cavity extending therethrough closed at the head end and opened at the stem end being substantially uniform in diameter throughout the length of the stem and said stem having an enlarged annular portion at the extremity thereof adjacent the open end of the cavity, partly filling the cavity with a cooling medium, placing a plug having a convex surface with its convex surface in line contact relation upon the stem end of the valve part at the junction of the opening into the cavity and the end extremity of the stem, applying an electrical resistance welding current and axial pressure to weld the plug to the stem effective to inhibit foreign matter from the cavity of the valve in the further working of the valve, compressing the enlarged portion of the valve in heated state with the plug as a part thereof to close the cavity in the stem over a portion thereof adjacent the plug and effect a welding of the compressed annular portion of the stem substantially along the axis of the stem so as to seal the cooling medium in the valve part, removing the end of the compressed portion of the valve stem incorporating the plug and then machining the valve to completion.

WILLIAM E. CLEMENTS.

REFERENCES CITED

The following references are of record in the file of this patent:

UNITED STATES PATENTS

| Number | Name | Date |
|---|---|---|
| 1,420,224 | Simons | June 20, 1922 |
| 1,501,862 | Midgley | July 15, 1924 |
| 1,823,452 | Heron | Sept. 15, 1931 |
| 1,824,323 | Boyle | Sept. 22, 1931 |
| 2,009,045 | Flinterman | July 23, 1935 |
| 2,093,771 | Colwell | Sept. 21, 1937 |
| 2,274,667 | Colwell | Mar. 3, 1942 |
| 2,280,686 | Colwell | Apr. 21, 1942 |